(12) United States Patent
Jo et al.

(10) Patent No.: US 12,249,894 B2
(45) Date of Patent: Mar. 11, 2025

(54) MOTOR

(71) Applicant: LG INNOTEK CO., LTD., Seoul (KR)

(72) Inventors: Jung Woo Jo, Seoul (KR); Jin Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 443 days.

(21) Appl. No.: 17/595,903

(22) PCT Filed: May 28, 2020

(86) PCT No.: PCT/KR2020/006922
§ 371 (c)(1),
(2) Date: Nov. 29, 2021

(87) PCT Pub. No.: WO2020/242222
PCT Pub. Date: Dec. 3, 2020

(65) Prior Publication Data
US 2022/0231570 A1 Jul. 21, 2022

(30) Foreign Application Priority Data

May 28, 2019 (KR) .......... 10-2019-0062627
Dec. 4, 2019 (KR) .......... 10-2019-0160088

(51) Int. Cl.
*H02K 7/00* (2006.01)
*H02K 1/278* (2022.01)
*H02K 1/28* (2006.01)

(52) U.S. Cl.
CPC ............ *H02K 7/003* (2013.01); *H02K 1/278* (2013.01); *H02K 1/28* (2013.01)

(58) Field of Classification Search
CPC .......... H02K 1/28; H02K 1/278; H02K 7/003; H02K 1/27; F16C 35/07; H01F 41/0266
(Continued)

(56) References Cited

U.S. PATENT DOCUMENTS

2014/0028119 A1* 1/2014 Sagalovskiiy ......... H02K 15/03
310/43
2016/0028282 A1 1/2016 Geis et al.
(Continued)

FOREIGN PATENT DOCUMENTS

CN 105610260 A 5/2016
JP 9-9539 A 1/1997
(Continued)

OTHER PUBLICATIONS

Matsumura, "Rotor, Motor and Method for Manufacturing Rotor", (2015), English Machine Translated (Year: 2015).*
(Continued)

*Primary Examiner* — Terrance L Kenerly
*Assistant Examiner* — Theodore L Perkins
(74) *Attorney, Agent, or Firm* — Saliwanchik, Lloyd & Eisenschenk

(57) ABSTRACT

The present invention may provide a motor including a stator, a shaft having a hollow and disposed inside the stator, and a magnet disposed on an outer circumferential surface of the shaft, wherein the shaft includes protrusions in contact with the magnet, and the protrusions include first faces protruding from the outer circumferential surface of the shaft and second faces concavely disposed in an inner circumferential surface of the shaft.

9 Claims, 27 Drawing Sheets

(58) Field of Classification Search
USPC .................................. 310/156; 29/596, 607
See application file for complete search history.

(56) References Cited

U.S. PATENT DOCUMENTS

| | | | | |
|---|---|---|---|---|
| 2016/0049101 | A1* | 2/2016 | Weyermann | B29C 66/5326 |
| | | | | 428/192 |
| 2016/0079816 | A1* | 3/2016 | Islam | H02K 1/276 |
| | | | | 310/156.38 |
| 2016/0190882 | A1* | 6/2016 | Maeda | H02K 7/003 |
| | | | | 417/423.1 |
| 2018/0335077 | A1* | 11/2018 | Oessenich | F16C 3/026 |
| 2019/0058377 | A1* | 2/2019 | Butzmann | H02K 11/0094 |

FOREIGN PATENT DOCUMENTS

| | | | | |
|---|---|---|---|---|
| JP | 9-51642 | A | | 2/1997 |
| JP | 2002-10543 | A | | 1/2002 |
| JP | 3304588 | B2 * | | 7/2002 |
| JP | 2004-15873 | A | | 1/2004 |
| JP | 2013-9572 | A | | 1/2013 |
| JP | 2015100202 | A * | 5/2015 | .............. H02K 1/27 |
| JP | 2019-71757 | A | | 5/2019 |
| WO | WO-2018224261 | A1 * | 12/2018 | |

OTHER PUBLICATIONS

Asai, "Rotor With Permanent Magnet And Manufacturing Method Thereof", (2002), English Machine Translated (Year: 2002).*
International Search Report dated Sep. 4, 2020 in International Application No. PCT/KR2020/006922.
Supplementary European Search Report dated Jul. 5, 2022 in European Application No. 20813535.0.

\* cited by examiner

MOTOR

CROSS-REFERENCE TO RELATED APPLICATIONS

This application is the U.S. national stage application of International Patent Application No. PCT/KR2020/006922, filed May 28, 2020, which claims the benefit under 35 U.S.C. § 119 of Korean Application Nos. 10-2019-0062627, filed May 28, 2019; and 10-2019-0160088, filed Dec. 4, 2019; the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, an electronic power steering (EPS) system in which the motor is used secures turning stability and provides a rapid restoring force by driving the motor according to traveling conditions using an electronic control unit (ECU). Accordingly, a driver of a vehicle can drive safely.

A motor includes a shaft and a stator. The shaft may have a hollow shape. Magnets may be attached to an outer circumferential surface of the shaft. In this case, the hollow shaft has a problem of difficulty in aligning positions of the magnets. This is because it is difficult to form guides for aligning the magnets due to a process of machining the hollow shaft. When there are no guides, which guide the magnets, on the shaft, and when the magnets are overmolded, a problem of misalignment of the magnet may occur. In addition, when the magnets are surrounded by a can or adhesive member, there is a risk of movement of the magnet.

Meanwhile, an adhesive is used to fix the magnets to the shaft. When the adhesive is used, there is a problem in that a long time is required for curing. In addition, when the magnets are overmolded, a problem of misalignment of the magnet may occur, and there is a problem in that it is difficult to check the misalignment. In addition, in the case of overmolding, since a thickness is large, there is a difficulty in securing a gap with respect to the stator.

Technical Problem

The present invention is directed to providing a motor allowing a magnet disposed on an outer circumferential surface of a hollow shaft to be aligned and fixed.

In addition, the present invention is directed to providing a motor in which a gap between a magnet and a stator is reduced, of which a process is simplified, and in which a position of the magnet is checked.

Technical Solution

One aspect of the present invention provides a motor including a stator, a shaft having a hollow and disposed inside the stator, and a magnet disposed on an outer circumferential surface of the shaft, wherein the shaft includes a plurality of protrusions in contact with the magnet, and the plurality of protrusions include first faces protruding from the outer circumferential surface of the shaft and second faces concavely disposed in an inner circumferential surface of the shaft.

Another aspect of the present invention provides a motor including a stator, a shaft having a hollow and disposed inside the stator, and a magnet disposed on an outer circumferential surface of the shaft, wherein the shaft includes a plurality of second holes passing through an inner side to an outer side of the shaft and a plurality of protrusions which are disposed in the plurality of second holes and of which at least parts protrude from the outer circumferential surface of the shaft and are in contact with the magnet.

The plurality of protrusions may be disposed to be spaced apart from each other in a circumferential direction of the shaft, and a separation distance between the plurality of protrusions in the circumferential direction may be greater than or equal to a width of the magnet.

The plurality of protrusions may be disposed to be spaced apart from each other in an axial direction of the shaft, and a separation distance between the protrusions in the axial direction may be smaller than or equal to a length of the magnet.

One protrusion of the plurality of protrusions may be disposed in an axial direction of the shaft, and a length of the one protrusion in the axial direction may be greater than ½ times a length of the magnet.

Each of the first face and the second face may include at least one flat surface.

The first face may include a curved surface in contact with the magnet.

A height from the outer circumferential surface of the shaft to an outer end of the protrusion may be smaller than a height of the magnet in a radial direction of the shaft.

The shaft may include a first hole which passes from in inner side to an outer side of the shaft, and the protrusion may extend from an edge of the first hole.

The motor may include a cover disposed outside the magnet, and the cover may include a groove in which the protrusion is disposed.

Threads may be disposed at a side surface of the protrusion and the second hole.

A knurling structure may be disposed on the protrusion.

Still another aspect of the present invention provides a motor including a stator, a shaft disposed inside the stator, a magnet coupled to the shaft, and a cover disposed outside the magnet, wherein the cover includes a first part and a second part extending from one side of the first part, an inner surface of the magnet is in contact with an outer surface of the shaft, an outer surface of the magnet is in contact with an inner surface of the first part, a part of an inner surface of the second part is in contact with the outer surface of the shaft, and the remaining part of the inner surface of the second part is disposed to be spaced apart from the outer surface of the shaft so that a space is disposed between the outer surface of the shaft and the inner surface of the second part.

The cover may include a third part extending from the other side of the first part, a part of an inner surface of the third part may be in contact with the outer surface of the shaft, and the remaining part of the inner surface of the third part may be disposed to be spaced apart from the outer surface of the shaft so that a space is disposed between the outer surface of the shaft and a surface of the other end of the magnet.

The cover may include a plurality of first regions disposed to be spaced apart from each other in a circumferential direction around a center of the shaft, and a distance from the outer surface of the shaft to the first region in a radial direction may be smaller than a shortest distance from the outer surface of the shaft to the outer surface of the magnet in the radial direction.

The magnet may include a first unit magnet and a second unit magnet, the first region may be disposed between the first unit magnet and the second unit magnet, and the first region may be disposed in an axial direction.

The cover may include a second region constituting a multilayer in a radial direction from a center of the shaft.

The cover may include a first layer and a second layer stacked on the first layer in the second region, and one side edge of the second layer may be disposed to be inclined with respect to one side edge of the first layer.

The cover may include a third region having a different thickness in the radial direction from a center of the shaft.

An outer surface of the cover may include a stop region.

The cover may be a member in which epoxy is impregnated in fiber.

The shaft may include a protrusion in contact with the magnet, and the protrusion may be disposed to be spaced apart from the cover.

Advantageous Effects

According to the embodiment, a useful effect of easily aligning a magnet disposed on an outer circumferential surface of a hollow shaft is provided.

According to the embodiment, a useful effect of inhibiting movement of the magnet when the magnet is surrounded in an overmolding manner or by a can is provided.

According to the embodiment, since a size of each protrusion can be formed to be small, the number of the protrusions can be increased, and thus there is an advantage of more precisely guiding a position of the magnet.

According to the embodiment, there is an advantage of easily forming the protrusion through an embossing or punching process.

According to the embodiment, there is an advantage of inhibiting the magnet from escaping in a process using a knurling structure formed on a side surface of the protrusion.

According to the embodiment, there is an advantage of improving the performance of a motor by minimizing a thickness of a cover to significantly reduce a gap between the magnet and the stator.

According to the embodiment, since the position of the magnet can be checked from the outside of the cover, there is an advantage of easily identifying a defect of the magnet.

According to the embodiment, since an adhesive is not used when the magnet is fixed to the shaft, there is an advantage of reducing a process time.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations thereof.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Figure 1:
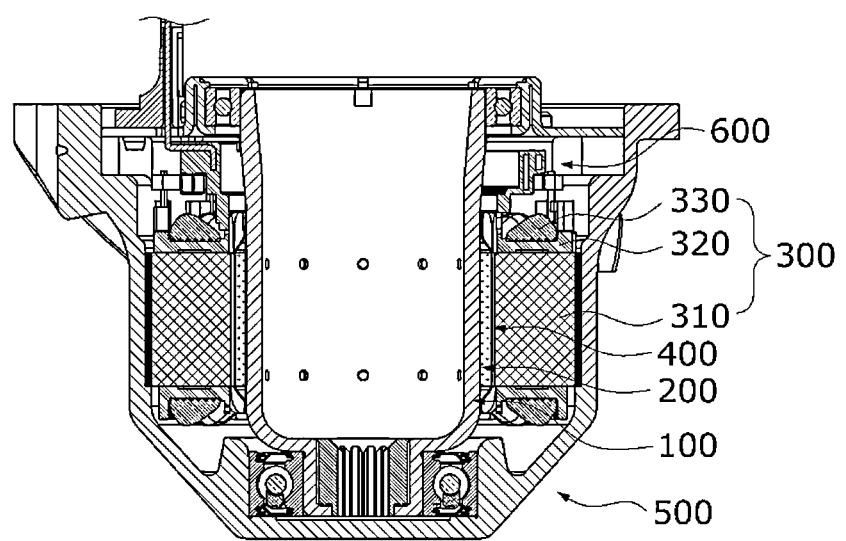
FIG. 1 is a view illustrating a motor according to an embodiment.

FIG. 1 is a view illustrating a motor according to the embodiment.

Referring to FIG. 1, the motor according to the embodiment may include a shaft 100, a magnet 200, a stator 300, a cover 400, a housing 500, and a busbar 600. Hereinafter, the term "inside" denotes a direction toward the shaft 100 in a radial direction of the motor, and the term "outside" denotes a direction opposite to "inside."

The shaft 100 may be a hollow member of which one side is open. Both ends of the shaft 100 may be rotatably supported by bearings in a axial direction. Portions, of which outer diameters are different, of the shaft 100 may be divided and disposed in the axial direction.

The magnet 200 is disposed on an outer circumferential surface of the shaft 100. The magnet 200 is rotated in conjunction with rotation of the shaft 100. The magnet 200 may be provided as a plurality of magnets.

The stator 300 is disposed outside the shaft 100 and the magnet 200. The stator 300 may include a stator core 310, insulators 320 installed on the stator core 310, and coils 330 wound around the insulators 320. The coil 330 generates a magnetic field. The stator core 310 may be one member or a combination of a plurality of divided cores. In addition, the stator core 310 may be formed in a form in which a plurality of thin steel plates are stacked, but the present invention is not necessarily limited thereto. For example, the stator core 310 may also be formed as one single part.

The cover 400 fixes the magnet 200 to the shaft 100. The cover 400 surrounds some regions of the magnet 200 and some regions of the shaft 100. The cover 400 may be a molded member formed in an overmolding manner or a can member or adhesive member surrounding the magnet 200.

The housing 500 may be disposed outside the stator 300. The housing 500 may be a cylindrical member of which an upper portion is open. The housing 500 accommodates the shaft 100, the magnet 200, the stator 300, and the cover 400 thereinside. In addition, the housing 500 may accommodate the bearing which supports the shaft 100.

The busbar 600 is disposed on the stator 300. The busbar 600 connects the coils 330 wound around the cores of the stator 300.

Figure 2:
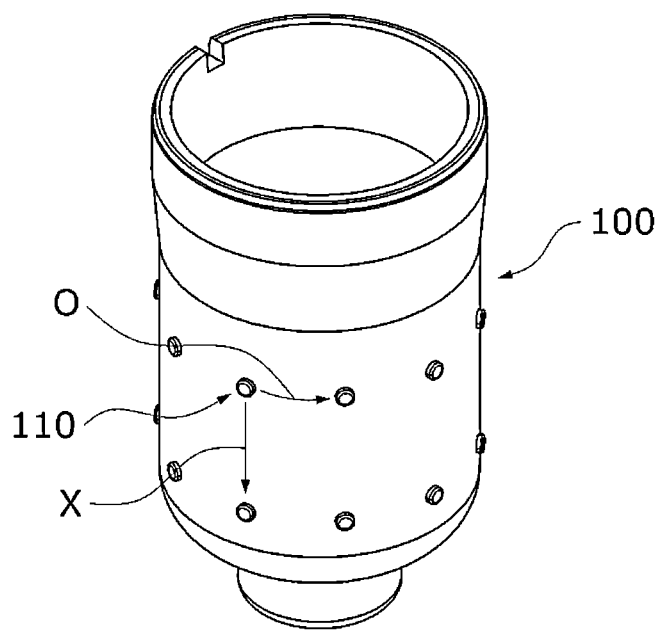
FIG. 2 is a perspective view illustrating a shaft.
Figure 3:
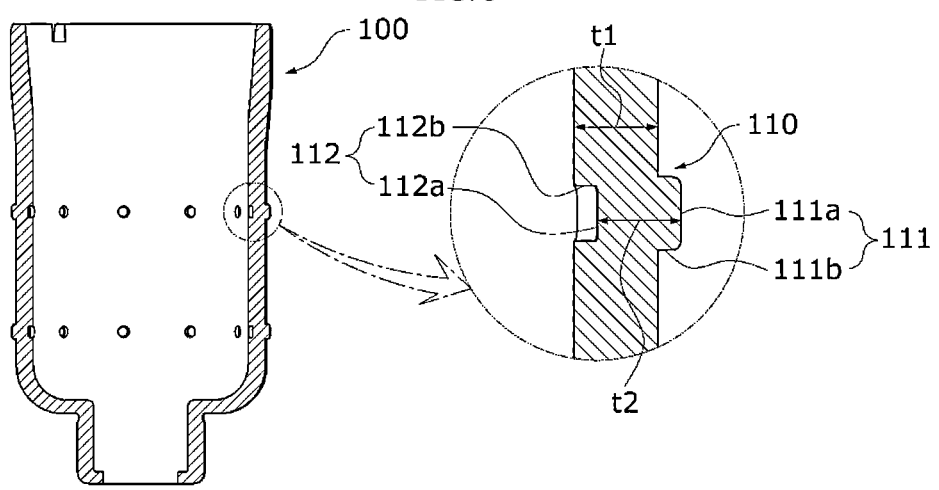
FIG. 3 is a side cross-sectional view illustrating protrusions of the shaft.

FIG. 2 is a perspective view illustrating the shaft 100, and FIG. 3 is a side cross-sectional view illustrating protrusions 110 of the shaft 100.

The shaft 100 is a hollow member and may be formed through a pressing process.

Referring to FIGS. 2 and 3, the shaft 100 includes the plurality of protrusions 110 in contact with the magnets 200. The plurality of protrusions 110 are disposed on the outer circumferential surface of the shaft 100. The plurality of protrusions 110 may be disposed to be spaced apart from each other in a circumferential direction O of the shaft 100. In addition, the plurality of protrusions 110 may be disposed to be spaced apart from each other in an axial direction X of the shaft 100. The protrusions 110 serve to arrange and fix the magnets 200 disposed on the outer circumferential surface of the shaft 100.

The plurality of protrusions 110 include first faces 111 and second faces 112. The first faces 111 may protrude from the outer circumferential surface of the shaft 100. The second faces 112 may be concavely disposed in an inner circumferential surface of the shaft 100.

The first faces 111 may include first-1 faces 111a and first-2 faces 111b. The first-1 faces 111a are portions protruding from the outer circumferential surface of the shaft 100. The first-2 faces 111b connect the outer circumferential surface of the shaft 100 and the first-1 faces 111a. The first-1 face 111a may include a flat surface, and the first-2 face 111b may include a curved surface in contact with the magnet 200. The curved surface of the first-2 face 111b is in line contact with a side surface of the magnet 200 to guide the magnet 200 to be smoothly inserted between the protrusions 110. In addition, a knurling structure may be applied to the first-2 face 111b to increase a fixing force between the shaft and the magnet.

The second faces 112 may include second-1 faces 112a and second-2 faces 112b. The second-1 faces 112a are portions concavely formed in the inner circumferential surface of the shaft 100. The second-2 face 112b connects the inner circumferential surface of the shaft 100 and the second-1 face 112a. The second-1 face 112a may include a flat surface, and the second-2 face 112b may include a curved surface.

The first face 111 and the second face 112 may be formed through an embossing process performed on an inner side of the hollow shaft 100. A distance t2 between the first face 111 and the second face 112 may be the same as a thickness t1 of the shaft 100 around the protrusion 110.

Figure 4:
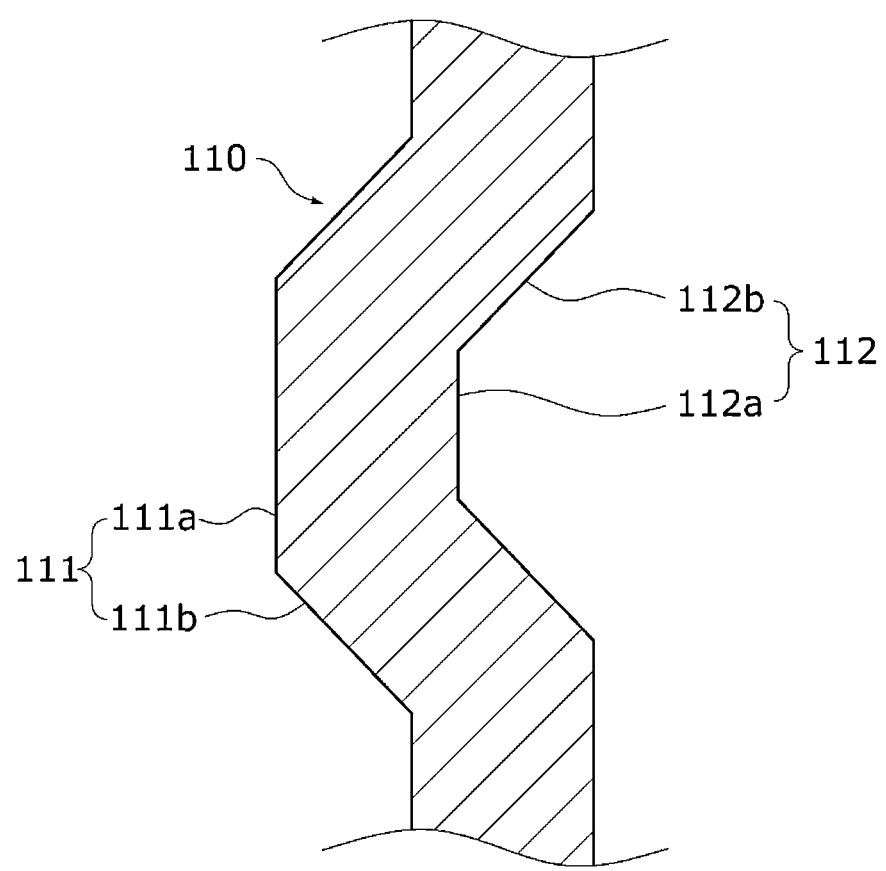
FIG. 4 is a side cross-sectional view illustrating a modified example of the protrusion of the shaft.

FIG. 4 is a side cross-sectional view illustrating a modified example of the protrusion 110 of the shaft 100.

Referring to FIG. 4, in the modified example of the protrusion 110, a first-2 face 111b may be disposed to be inclined in a direction toward a first-1 face 111a. In addition, a second-2 face 112b may be disposed to be inclined in a direction toward a second-1 face 112a. A side cross-sectional shape of the protrusion 110 may be a substantially trapezoidal shape. In addition, a knurling structure may be applied to the first-2 face 111b to increase the fixing force between the shaft and the magnet.

Figure 5:
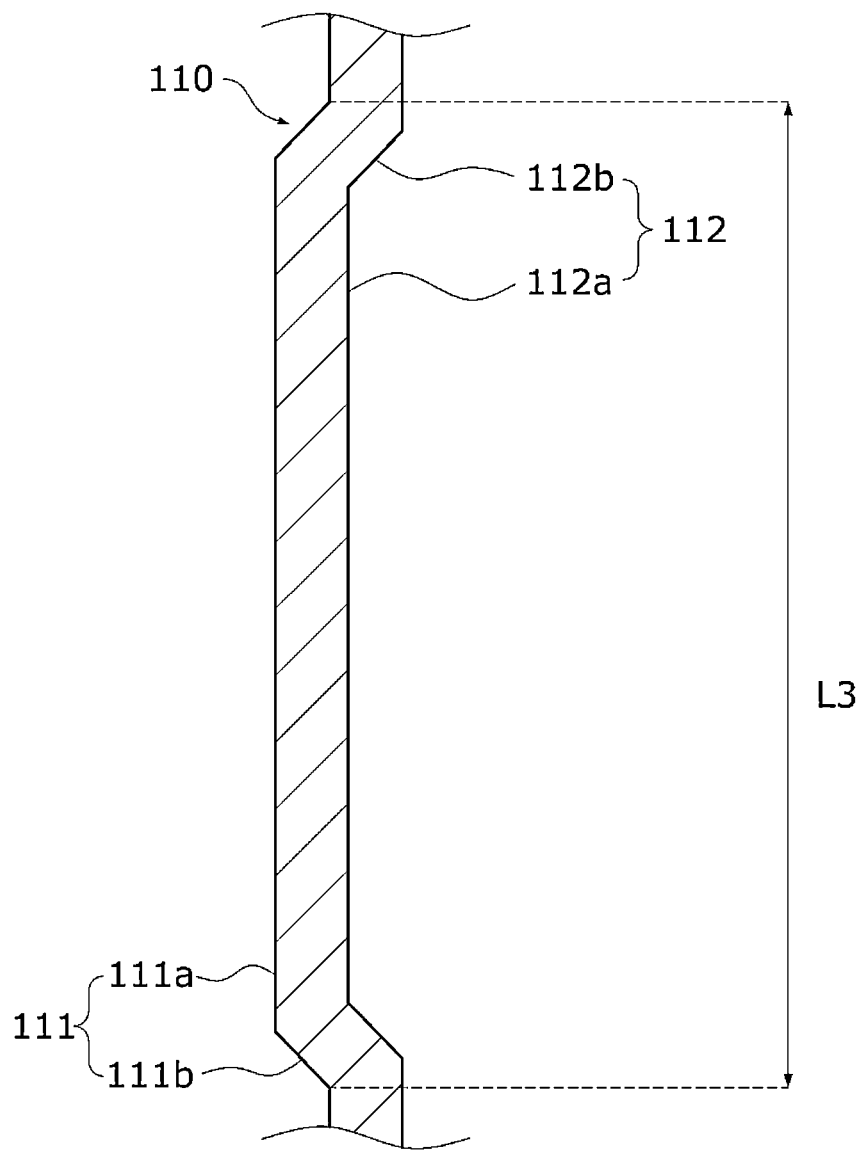
FIG. 5 is a side cross-sectional view illustrating another modified example of the protrusion of the shaft.

FIG. 5 is a side cross-sectional view illustrating another modified example of the protrusion 110 of the shaft 100.

Referring to FIG. 5, the plurality of protrusions 110 may be disposed in the circumferential direction of the shaft 100, but one protrusion 110 may be disposed in the axial direction of the shaft 100. In one protrusion 110, a first-1 face 111a and a second-1 face 112a may be longitudinally disposed in the axial direction. In addition, a knurling structure may be applied to the first-2 face 111b to increase the fixing force between the shaft and the magnet. The first face 111 and the second face 112 may be formed through a beading process performed on the inner side of the hollow shaft 100.

Figure 6:
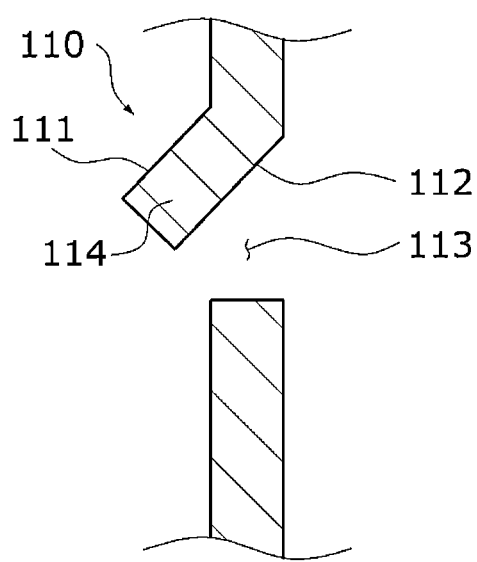
FIGS. 6 and 7 are side cross-sectional views illustrating still other modified examples of the protrusion of the shaft.
Figure 7:
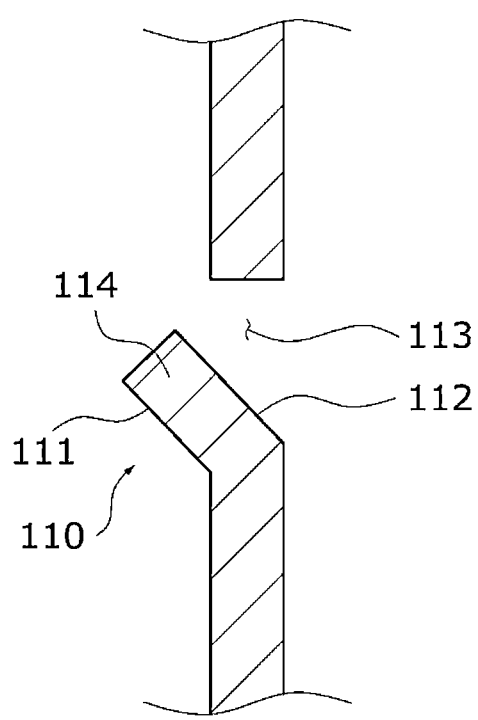

FIGS. 6 and 7 are side cross-sectional views illustrating still other modified examples of the protrusion 110 of the shaft 100.

Referring to FIGS. 6 and 7, the shaft 100 may include a first hole 113 passing through the inner side to an outer side of the shaft 100. The first hole 113 may be formed in a quadrangular shape. The protrusion 110 may extend from an edge of the first hole 113. A side surface of the protrusion 110 may include a flat surface 114 in contact with the magnet 200. The protrusion 110 may be provided as a plurality of protrusions disposed in the circumferential direction of the shaft 100. In addition, the protrusion 110 may be provided as a plurality of protrusions disposed in the axial direction of the shaft 100. In addition, a knurling structure may be applied to the flat surface 114, which is in contact with the magnet 200, of the side surface of the protrusion to increase the fixing force between the shaft 100 and the magnet 200.

For example, as illustrated in FIG. 6, a first face 111 of the protrusion 110 may be disposed to be inclined downward. In addition, a second face 112 of the protrusion 110 may also be disposed to be inclined downward.

Alternatively, as illustrated in FIG. 7, a first face 111 of the protrusion 110 may be disposed to be inclined upward. In addition, a second face 112 of the protrusion 110 may also be disposed to be inclined upward.

Although the protrusions 110 having various shapes are illustrated, the present invention is not limited thereto, and the protrusion 110 may be changed to a protrusion 110 having one of various shapes formed through an embossing process performed on the inner side of the shaft 100.

By using the protrusion 110, the magnet 200 disposed on the shaft 100 may be guided and fixed. Since the magnet 200 is directly guided and fixed to the shaft 100, there is an advantage of omitting a rotor core.

In addition, the protrusion 110 may be implemented to have a small size, and the number of the protrusions 110 may be relatively greatly increased when compared to a general guide structure. Accordingly, there is an advantage of more precisely guiding a position of the magnet 200.

In addition, there is an advantage of easily forming the protrusion 110 through the embossing process.

Figure 8:
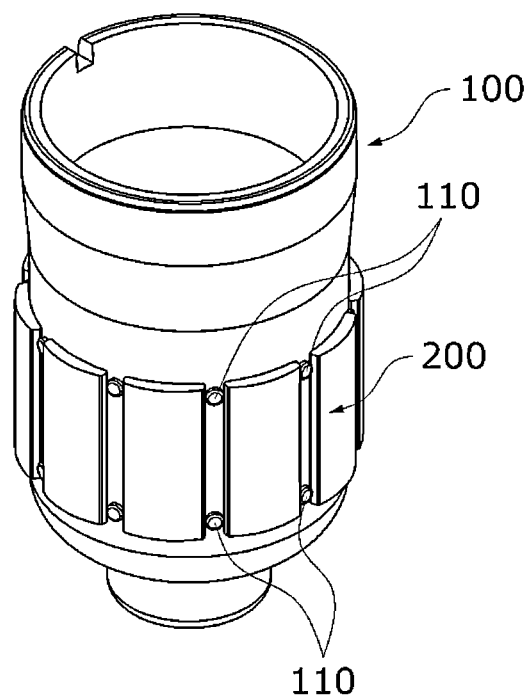
FIG. 8 is a perspective view illustrating the shaft on which magnets are disposed on an outer circumferential surface thereof.

FIG. 8 is a perspective view illustrating the shaft 100 on which the magnets 200 are disposed on the outer circumferential surface thereof.

Referring to FIG. 8, the plurality of magnets 200 are disposed on the outer circumferential surface of the shaft 100. The magnet 200 is disposed between the protrusions 110 in the circumferential direction of the shaft 100. The side surface of the protrusion 110 is in contact with the side surface of the magnet 200.

Figure 9:
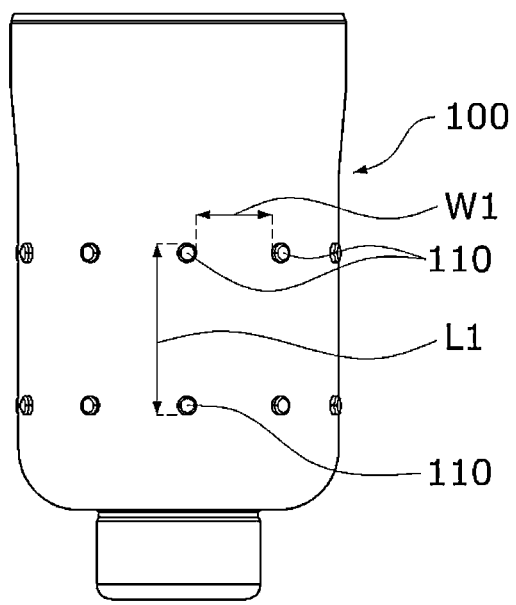
FIG. 9 is a view illustrating a separation distance between the protrusions.
Figure 10:
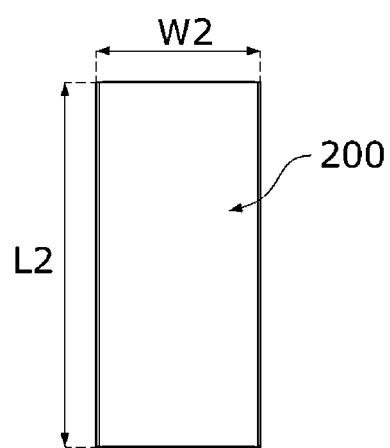
FIG. 10 is a view illustrating a size of the magnet.

FIG. 9 is a view illustrating a separation distance between the protrusions 110, and FIG. 10 is a view illustrating a size of the magnet 200.

Referring to FIGS. 9 and 10, a separation distance W1 between the protrusions 110 in the circumferential direction may be greater than or equal to a width W2 of the magnet 200. This is to allow the magnet 200 to be positioned between the protrusions 110 in the circumferential direction of the shaft 100.

In addition, referring to FIGS. 9 and 10, a separation distance L1 between the protrusions 110 in the axial direction may be smaller than or equal to a length L2 of the magnet 200. This is to guide the magnet 200 using at least two protrusions 110 disposed at the same column in the axial direction.

Meanwhile, as illustrated in FIG. 5, when one protrusion 110 is disposed in the axial direction of the shaft 100, a length L3 of the corresponding protrusion 110 may be greater than ½ times the length L2 of the magnet 200. This is a minimum length of the protrusion 110 so that the magnet 200 is guided and fixed by the protrusions 110 without being misaligned.

Figure 11:
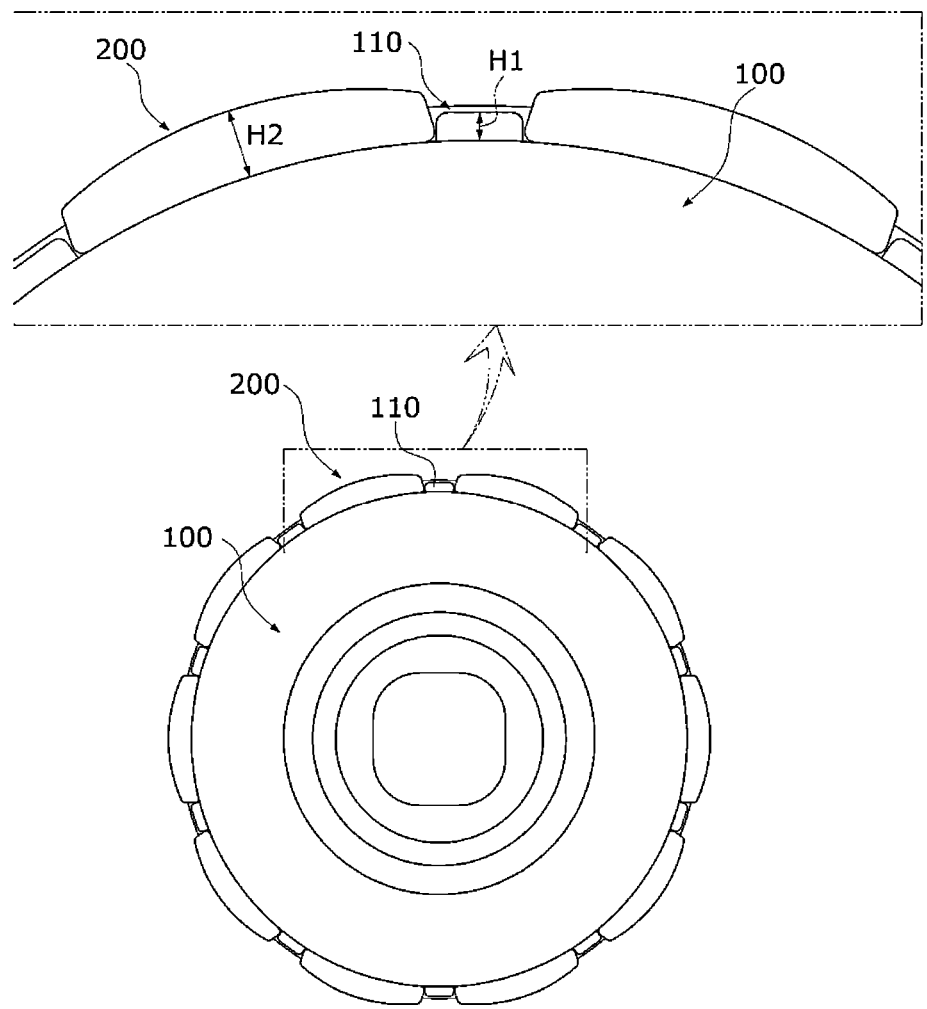
FIG. 11 is a front view illustrating the shaft in order for comparing a height of the protrusion and a height of the magnet.

FIG. 11 is a front view illustrating the shaft 100 in order for comparing a height of the protrusion 110 and a height of the magnet 200.

Referring to FIG. 11, a height H1 from the outer circumferential surface of the shaft 100 to an outer end of the protrusion 110 may be smaller than a height H2 of the magnet 200 in a radial direction of the shaft 100. A center of a width of the protrusion 110 in the circumferential direction of the shaft 100 may be a reference point of the height H1 of the protrusion 110. In addition, a center of a width of the magnet 200 in the circumferential direction of the shaft 100 may be a reference point of the height H2 of the magnet 200. This is in consideration of a position of the cover 400 which covers the magnet 200. Although the protrusion 110 is illustrated in FIG. 11, even in the case of each of protrusions 120 having different shapes, a height from the outer circumferential surface of the shaft 100 to an outer end of the protrusion 120 may be smaller than the height H2 of the magnet 200.

Figure 12:
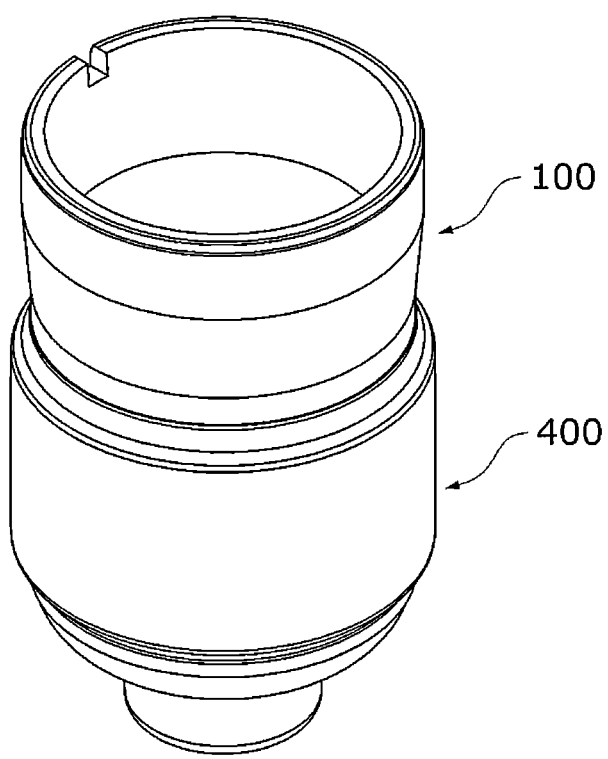
FIG. 12 is a view illustrating the shaft on which a cover is disposed in an overmolding manner.
Figure 13:
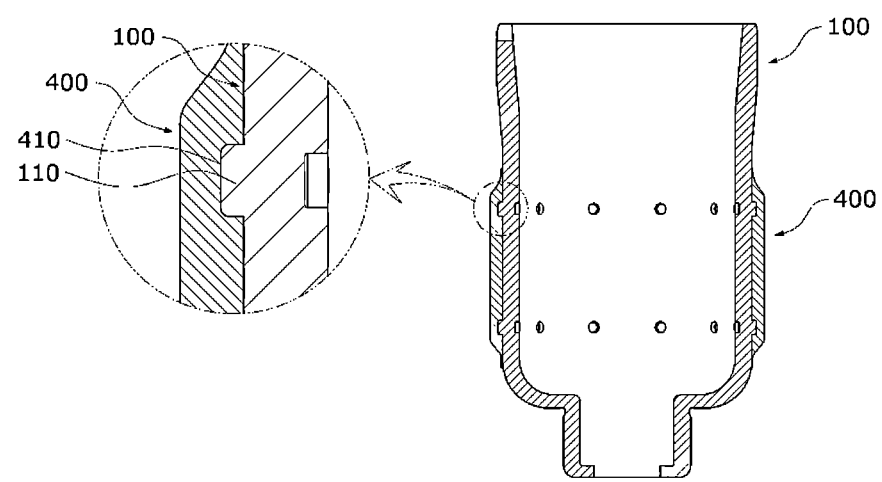
FIG. 13 is a side cross-sectional view illustrating the shaft illustrated in FIG. 12.

FIG. 12 is a view illustrating the shaft 100 on which the cover 400 is disposed in the overmolding manner, and FIG. 13 is a side cross-sectional view illustrating the shaft 100 illustrated in FIG. 12.

Referring to FIGS. 12 and 13, the cover 400 may be a molded member formed in the overmolding manner. The cover 400 includes grooves 410 in which the protrusions 110 are disposed. Since the protrusions 110 are disposed in the grooves 410, a coupling force between the cover 400 and the shaft 100 increases, and a coupling force between the cover 400 and the magnet 200 increases.

Figure 14:
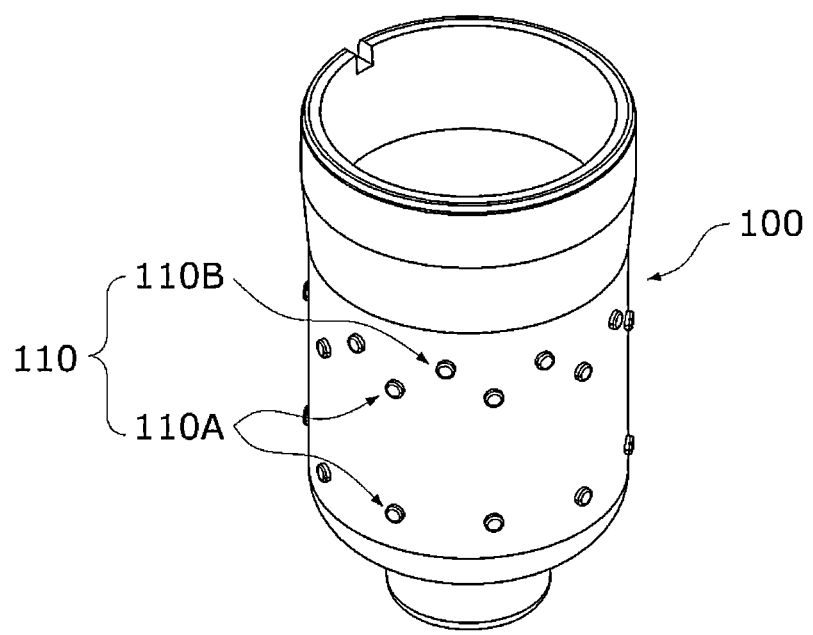
FIG. 14 is a view illustrating protrusions disposed at upper sides of the magnets.

FIG. 14 is a view illustrating protrusions 110 disposed at upper sides and lateral sides of the magnets 200.

Referring to FIG. 14, the protrusions 110 include first-1 protrusions 110A disposed at the lateral sides of the magnets 200 and first-2 protrusions 110B disposed at the upper sides of the magnets 200. Since the first-2 protrusion 110B is disposed at the upper side of the magnet 200 to be in contact with an upper end of the magnet 200, the magnet 200 may be inhibited from escaping upward from a regular position.

Figure 15:
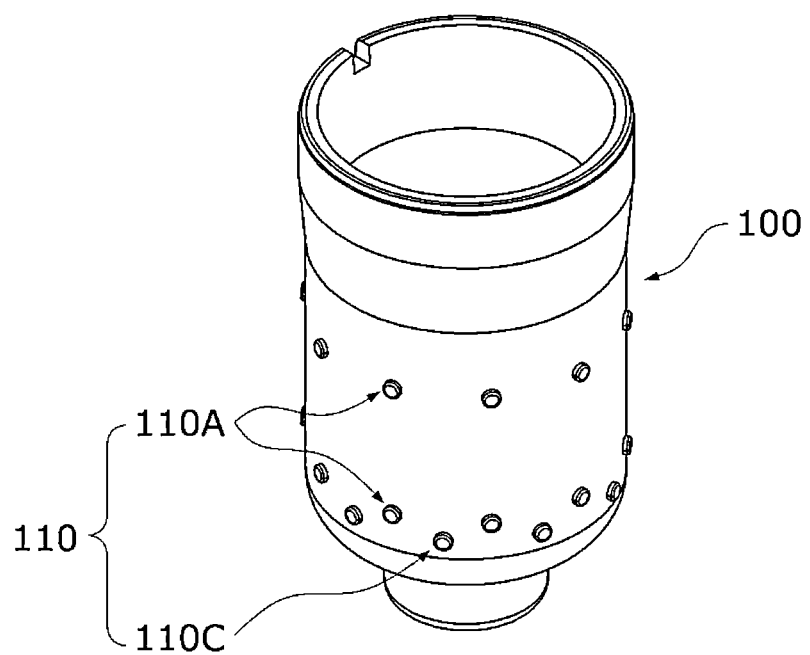
FIG. 15 is a view illustrating protrusions disposed at lower sides of the magnets.

FIG. 15 is a view illustrating protrusions 110 disposed at lower sides and the lateral sides of the magnets 200.

Referring to FIG. 15, the protrusions 110 may include first-1 protrusions 110A disposed at the lateral sides of the magnets 200 and first-3 protrusions 110C disposed at the lower sides of the magnets 200. Since the first-3 protrusion 110C is disposed at the lower side of the magnet 200 to be in contact with the magnet 200, the magnet 200 may be inhibited from escaping downward from the regular position.

Figure 16:
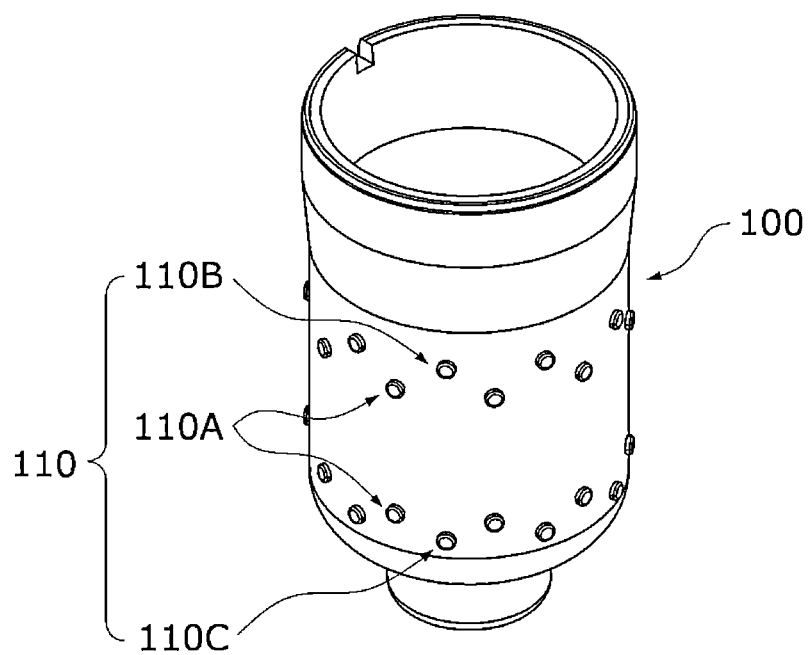
FIG. 16 is a view illustrating protrusions disposed at upper sides and lower sides of the magnets.

FIG. 16 is a view illustrating protrusions 110 disposed at the upper sides and the lower sides of the magnets 200.

Referring to FIG. 16, the protrusions 110 may include first-1 protrusions 110A disposed at the lateral sides of the magnets 200, first-2 protrusions 110B disposed at the upper sides of the magnets 200, and first-3 protrusions 110C disposed at the lower sides of the magnets 200. Since the first-2 protrusion 110B is in contact with the upper end of the magnet 200, the magnet 200 is inhibited from escaping upward from the regular position, and since the first-3 protrusion 110C is in contact with the lower end of the magnet 200, the magnet 200 is inhibited from escaping downward from the regular position.

Although the protrusion 110 has been illustrated as described above, a protrusion 120, which has a form different from the form described above, illustrated in each of FIGS. 17 to 19 may also include at least one of the first-1 protrusion disposed at the lateral side of the magnet 200, the first-2 protrusion disposed at the upper side of the magnet 200, and the first-3 protrusion 110C disposed at the lower side of the magnet 200.

Figure 17:
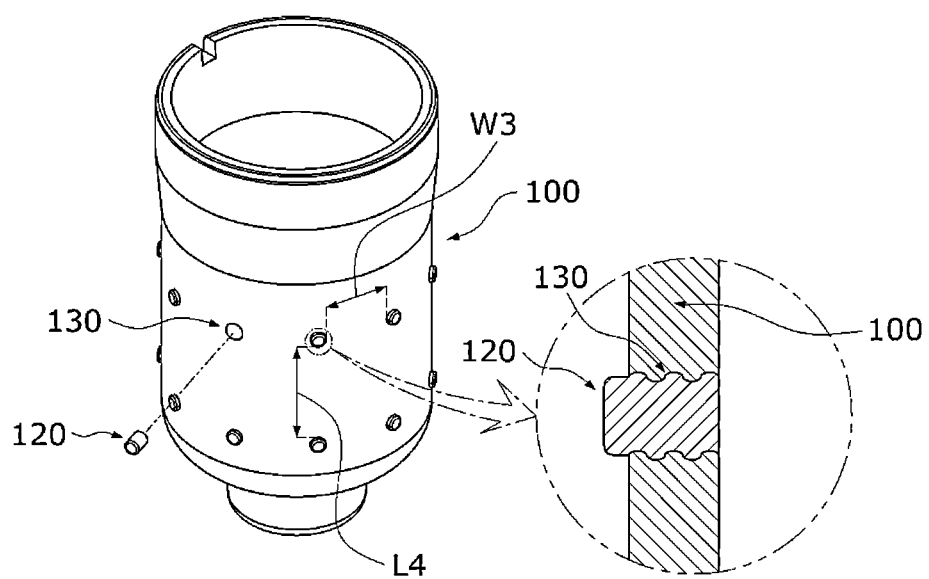
FIG. 17 is a view illustrating the shaft including protrusions and second holes.

FIG. 17 is a view illustrating the shaft 100 including the protrusions 120 and second holes 130.

Referring to FIG. 17, the shaft 100 may include the second holes 130 passing through the inner side to the outer side of the shaft 100. The plurality of second holes 130 may be disposed in the circumferential direction of the shaft 100. In addition, the plurality of second holes 130 may be disposed in the axial direction of the shaft 100. The plurality of second holes 130 may be formed through a punching process.

The protrusions 120 may be disposed in the plurality of second holes 130. The protrusion 120 is disposed so that at least a part of the protrusion 120 protrudes from the outer circumferential surface of the shaft 100 in a state in which the protrusion 120 is inserted into the second hole 130. The protrusion 120 may be formed of a plastic resin. The protrusion 120 is in contact with the magnet 200. A thread capable of increasing a coupling force between the protrusion 120 and the shaft 100 may be formed in an area of a side surface, with which the shaft 100 is in contact, of the protrusion 120. A knurling structure for increasing the fixing force between the magnet 200 and the shaft 100 may be applied to the portion, which is not in contact with the shaft 100, of the side surface of the protrusion 120.

Figure 18:
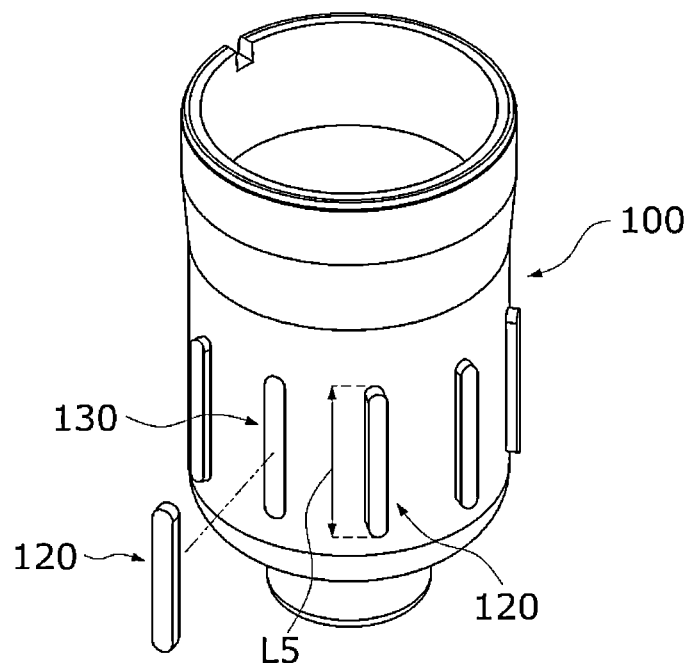
FIG. 18 is a perspective view illustrating the shaft including protrusions which are a modified example thereof.

FIG. 18 is a perspective view illustrating the shaft 100 including protrusions 120 which are a modified example thereof.

Referring to FIG. 18, although a plurality of second holes 130 may be disposed in the circumferential direction, one second hole 130 having a long hole shape may be disposed in the axial direction of the shaft 100. In addition, although the plurality of protrusions 120 may also be disposed in the circumferential direction to correspond thereto, one protrusion 120 may be disposed in the axial direction of the shaft 100. A knurling structure for increasing the fixing force between the magnet 200 and the shaft 100 may be applied to a portion, which is not in contact with the shaft 100, of the side surface of the protrusion 120.

Referring to FIG. 17, a separation distance W3 between the protrusions 120 in the circumferential direction may be greater than or equal to the width W2 of the magnet 200. This is to allow the magnet 200 to be positioned between the protrusions 120 in the circumferential direction of the shaft 100.

In addition, a separation distance L4 between the protrusions 120 in the axial direction may be smaller than or equal to the length L2 of the magnet 200. This is to allow at least two protrusions 120, which are disposed at the same column in the axial direction, to guide the magnet 200.

Referring to FIG. 18, when one protrusion 120 is disposed in the axial direction, a length L5 of the protrusion 110 may be greater than ½ times the length L2 of the magnet 200. This is a minimum length of the protrusion 120 so that the magnet 200 may be guided and fixed by the protrusions 120 without being misaligned.

Figure 19:
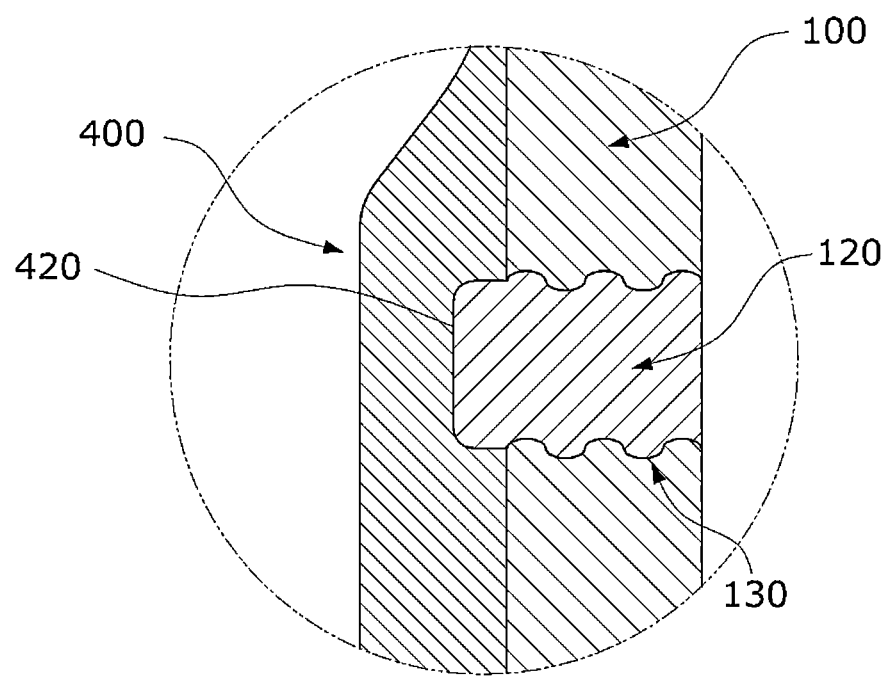
FIG. 19 is a side cross-sectional view illustrating the shaft on which a cover is disposed in an overmolding manner.

FIG. 19 is a side cross-sectional view illustrating the shaft 100 on which the cover 400 is disposed in an overmolding manner.

Referring to FIG. 19, the cover 400 includes grooves 420 in which the protrusions 120 are disposed. Since the protrusion 120 is disposed in the groove 420, a coupling force between the cover 400 and the shaft 100 increases, and a coupling force between the cover 400 and the magnet 200 increases at the same time.

Figure 20:
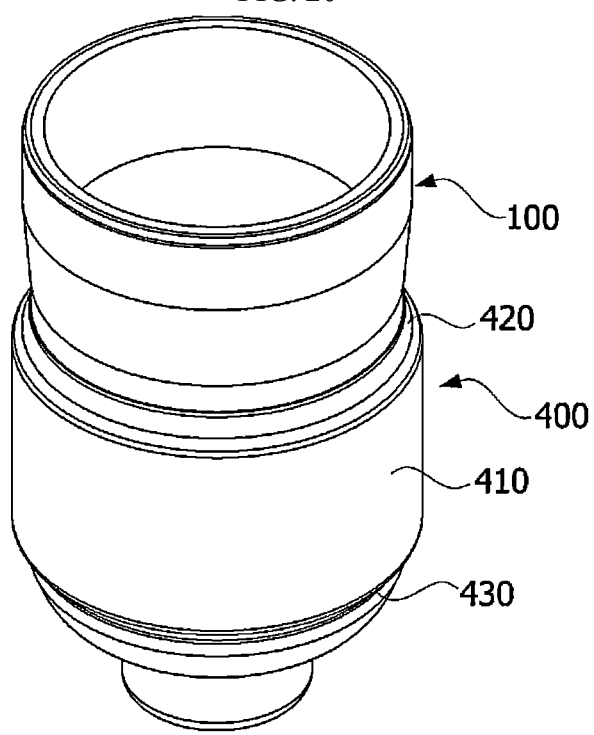
FIG. 20 is a view illustrating the shaft on which the cover is disposed.
Figure 21:
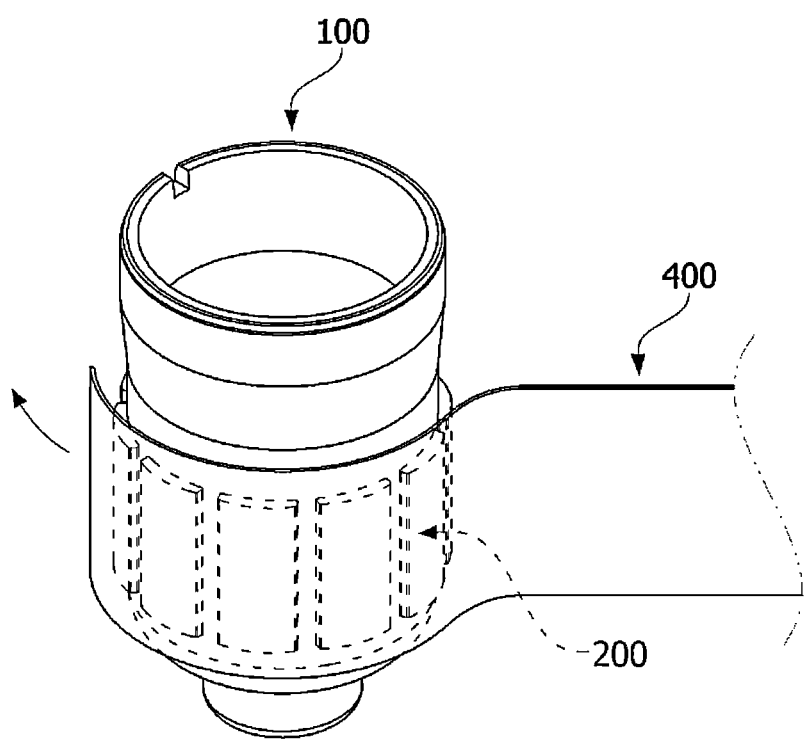
FIG. 21 is a view illustrating a state in which the cover is surrounding the magnets disposed on the outer circumferential surface of the shaft.

FIG. 20 is a view illustrating the shaft on which the cover 400 is disposed, and FIG. 21 is a view illustrating a state in which the cover 400 is surrounding the magnets 200 disposed on the outer circumferential surface of the shaft 100.

Referring to FIGS. 20 and 21, the cover 400 may be an adhesive member which surrounds the magnet 200 to fix the magnet 200 to the shaft 100. For example, the cover 400 may be a member in which a matrix is impregnated in reinforced fiber.

The cover 400 is a member in a semi-cured state and serves as an adhesive sheet which fixes the magnet 200 to the shaft 100. The reinforced fiber may be mainly carbon fiber, glass fiber, aramid fiber, or the like, and the matrix may be an epoxy resin, a polyester resin, or a thermoplastic resin. The carbon fiber has features of high tensile strength and high tensile modulus as mechanical properties and high heat resistance and high fire resistance as thermal properties. The glass fiber has features of high tensile strength and high tensile modulus as mechanical properties and a low coefficient of linear expansion as a thermal property. Both of the carbon fiber and the glass fiber have a high electrical insulation property.

In a state in which a part of the cover 400 is in contact with the shaft 100 and the magnet 200, when the shaft 100 rotates, the cover 400 may be wound around the shaft 100 in the form of naturally surrounding the magnet 200, and thus there is an advantage of a simple and rapid process.

The cover 400 may be divided into a first part 410, a second part 420, and a third part 430 in the axial direction. The second part 420 extends from one side of the first part 410. The third part 430 extends from the other side of the first part 410.

The first part 410 is a part which covers the magnet 200, and the second part 420 and the third part 430 are parts in contact with the shaft 100.

Figure 22:
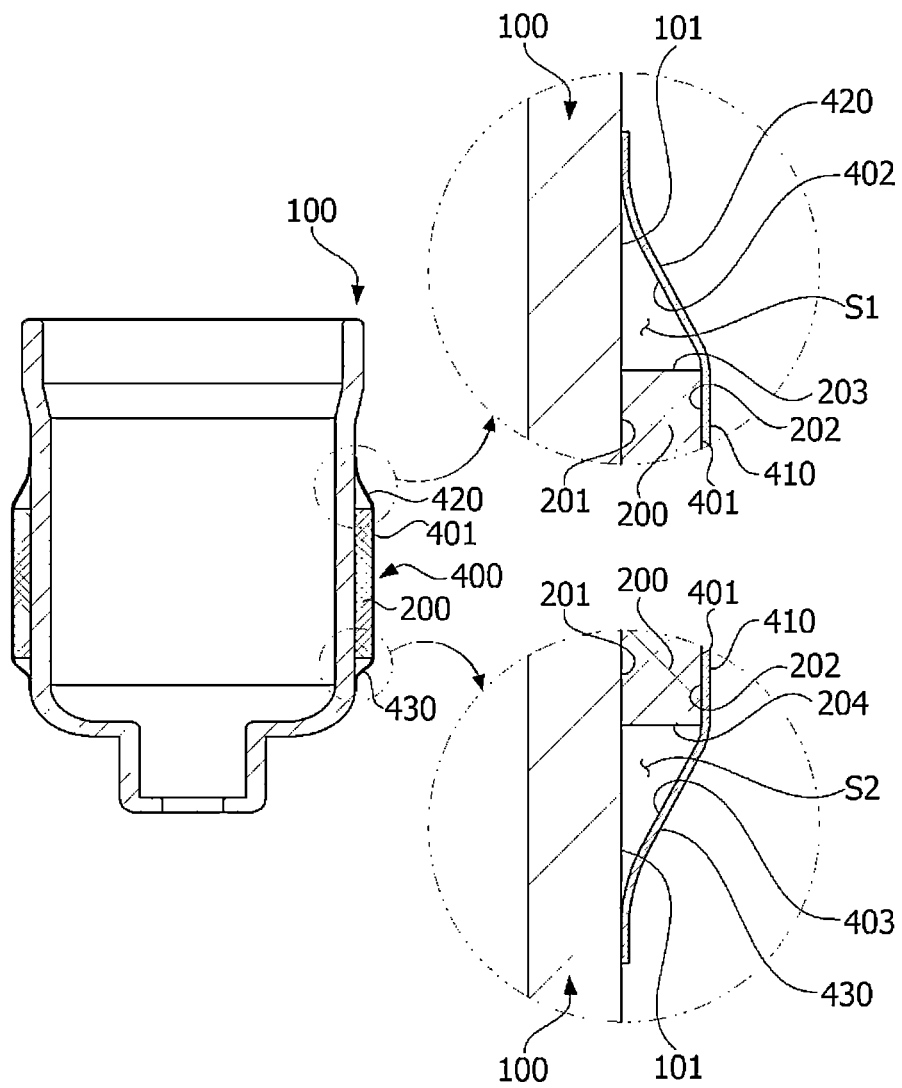
FIG. 22 is a side cross-sectional view illustrating the shaft, the magnet, and the cover.

FIG. 22 is a side cross-sectional view illustrating the shaft 100, the magnet 200, and cover 400.

Referring to FIG. 22, an inner surface of the magnet 200 is in contact with an outer surface of the shaft 100. In addition, an outer surface of the magnet 200 is in contact with an inner surface 401 of the first part 410. A part of an inner surface 402 of the second part 420 is in contact with the outer surface of the shaft 100, and the remaining part of the inner surface 402 of the second part 420 is disposed to be spaced apart from the outer surface of the shaft 100. A space S1 is formed between the outer surface of the shaft 100, a surface of one end 203 of the magnet 200, and the inner surface 402 of the second part 420.

In addition, a part of an inner surface 403 of the third part 430 is in contact with the outer surface of the shaft 100, and the remaining part of the inner surface 403 of the third part 430 is disposed to be spaced apart from the outer surface of the shaft 100. A space S2 is formed between the outer surface of the shaft 100, a surface of the other end 204 of the magnet 200, and the inner surface 403 of the third part 430.

Figure 23:
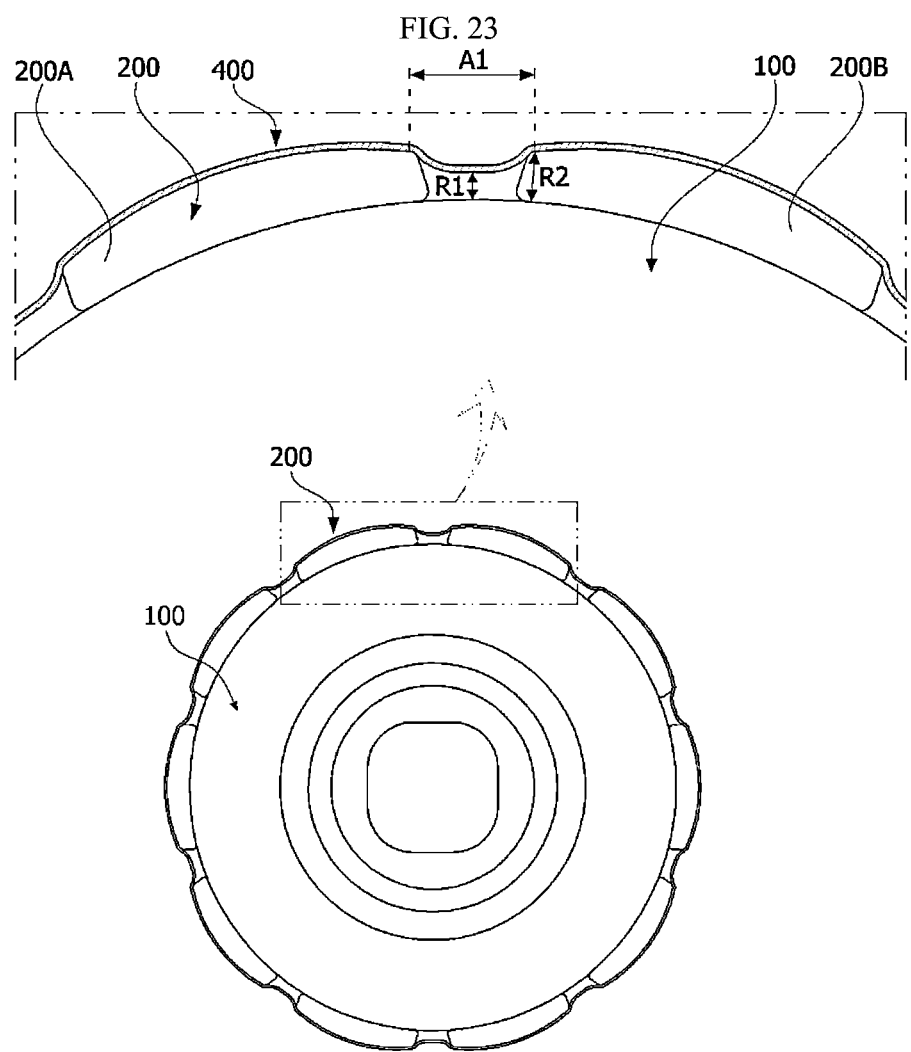
FIG. 23 is a plan cross-sectional view illustrating the shaft, the magnet, and the cover.

FIG. 23 is a plan cross-sectional view illustrating the shaft 100, the magnet 200, and the cover 400.

Referring to FIG. 23, the cover 400 may include a plurality of first regions A1. The plurality of first regions A1 may be disposed to be spaced apart from each other in the circumferential direction around a center of the shaft. In the first region A1, a distance R1 from the outer surface of the shaft 100 to the first region A1 in the radial distance is smaller than a shortest distance R2 from the outer surface of the shaft 100 to the outer surface of the magnet 200 in the radial direction. A side end of the outer surface of the magnet 200 in the circumferential direction may be a reference point of the shortest distance R2 from the outer surface of the shaft 100 to the outer surface of the magnet 200 when a bread shape of the outer surface of the magnet 200 is considered.

The first region A1 is disposed between a first unit magnet 200A and a second unit magnet 200B in the circumferential direction. In addition, the first region A1 is longitudinally disposed in the axial direction.

Since the first region A1 is visually distinguished from the other regions of the cover 400, a layout of the magnet 200 may be checked visually or checked through an image in a state in which the cover 400 surrounds the magnet 200. Accordingly, an operator may easily check whether there is a problem in the layout of the magnet 200.

Figure 24:
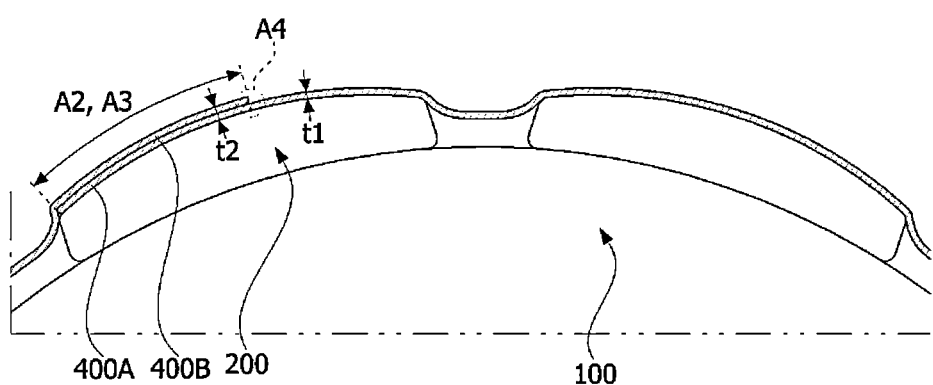
FIG. 24 is a plan cross-sectional view illustrating the shaft and the magnet which show a second region and a third region of the cover.

FIG. 24 is a plan cross-sectional view illustrating the shaft 100 and the magnet 200 which show a second region A2 and a third region A3 of the cover.

Referring to FIG. 24, the cover 400 may be wound around the shaft 100 to constitute a multilayer. Hereinafter, a region in which the cover 400 constitutes the multilayer in the radial direction is referred to as the second region A2, and a region having a thickness t2 different from a thickness t1 of one region in the radial direction from the center of the shaft is referred to as a third region A3.

The cover 400 may include a first layer 400A and a second layer 400B stacked on the first layer 400A in the second region A2. In the drawing, although the first layer 400A and the second layer 400B are illustrated, the present invention is not limited thereto, and more layers, such as a third layer, a four layer, and the like, may be formed. Accordingly, the second region A2 may be a region in which three or more layers are formed.

In FIG. 24, although it is illustrated that a position of the second region A2 and a position of the third region A3 are the same, the present invention is not limited thereto, and the position of the second region A2 and the position of the third region A3 may be also be different.

An outer surface of the cover 400 may include a stepped region A4.

Figure 25:
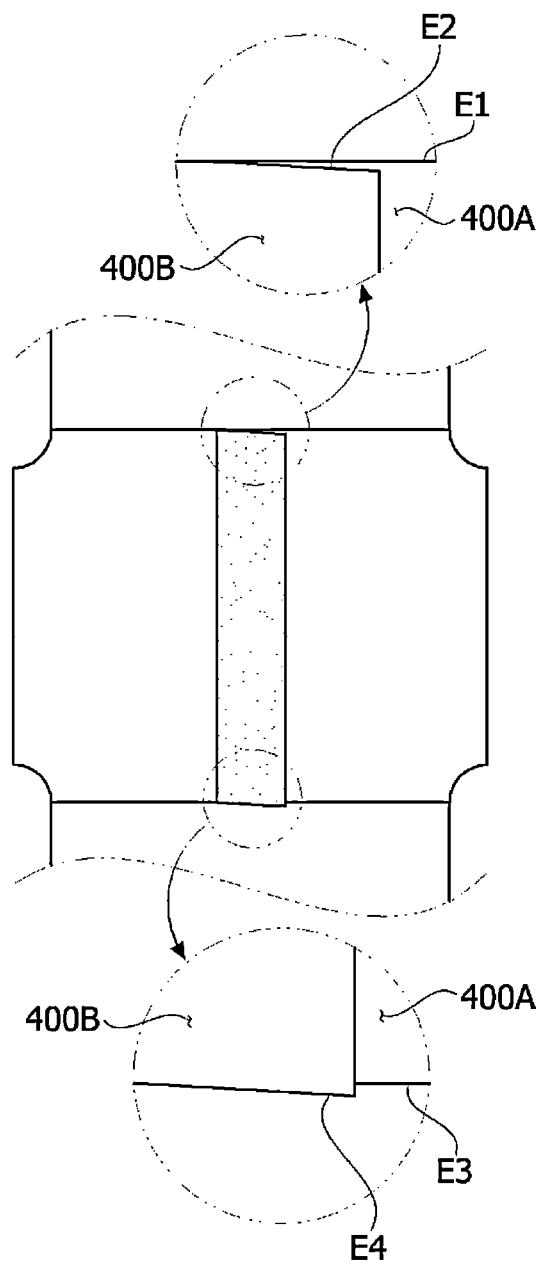
FIG. 25 is a view illustrating one side edge of the cover in the second region.

FIG. 25 is a view illustrating one side edges E1 and E2 of the cover 400 in the second region A2.

Referring to FIG. 25, in the second region A2, one side edge E2 of any one layer may be disposed to be inclined with respect to one side edge E1 of another layer. In addition, in the second region A2, the other edge E4 of any one layer may be disposed to be inclined with respect to the other side edge E3 of another layer. This may be a feature which is naturally formed in a process in which an end of the cover 400 is finished and attached after the cover 400 is wound around the shaft 100.

Figure 26:
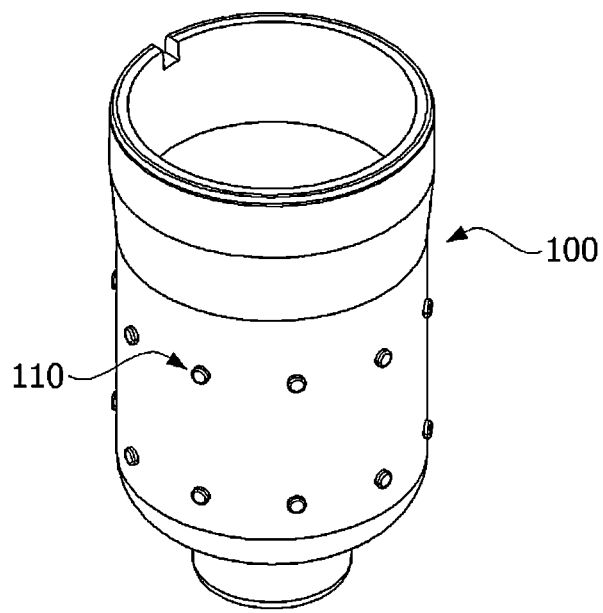
FIG. 26 is a perspective view illustrating the shaft including the protrusions.
Figure 27:
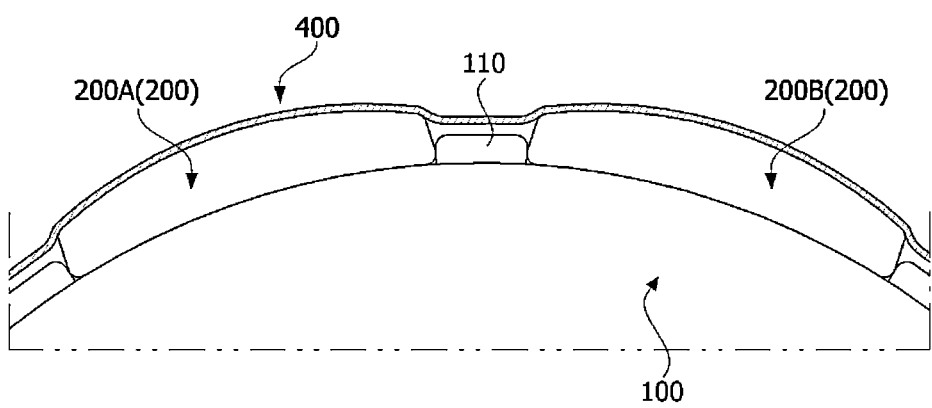
FIG. 27 is a plan cross-sectional view illustrating the shaft including the protrusion and the magnet.

FIG. 26 is a perspective view illustrating the shaft including the protrusions, and FIG. 27 is a plan cross-sectional view illustrating the shaft 100 including the protrusion and the magnet 200.

Referring to FIGS. 26 and 27, the shaft 100 includes the plurality of protrusions 110 in contact with the magnet 200. The plurality of protrusions 110 are disposed on the outer circumferential surface of the shaft 100. The plurality of protrusions 110 may be disposed to be spaced apart from each other in the circumferential direction of the shaft 100. In addition, the plurality of protrusions 110 may be disposed to be spaced apart from each other in the axial direction X of the shaft 100. The protrusions 110 serve to arrange and fix the magnet 200 disposed on the outer circumferential surface of the shaft 100. The protrusion may be formed through an embossing process performed on the inner side of the hollow shaft 100.

The protrusions 110 serve to fix the magnet 200 to inhibit the magnet from being misaligned while the cover 400 surrounds the magnet 200. The protrusion 110 may be disposed to be spaced apart from the cover 400.

As described above, the motor according to one exemplary embodiment of the present invention has been specifically described with reference to the accompanying drawings. The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
   a stator;
   a shaft disposed inside the stator;
   a magnet coupled to the shaft; and
   a cover disposed outside the magnet,
   wherein the cover includes a first part and a second part extending from one side of the first part,
   an inner surface of the magnet is in contact with an outer surface of the shaft,
   an outer surface of the magnet is in contact with an inner surface of the first part,
   a part of an inner surface of the second part is in contact with the outer surface of the shaft, and
   the remaining part of the inner surface of the second part is disposed to be spaced apart from the outer surface of the shaft so that a first space (S1) is disposed between the outer surface of the shaft and one end of the magnet,
   the cover includes a third part extending from another side of the first part;
   a part of an inner surface of the third part is in contact with the outer surface of the shaft; and
   the remaining part of the inner surface of the third part is disposed to be spaced apart from the outer surface of the shaft so that a second space (S2) is disposed between the outer surface of the shaft and a surface of another end of the magnet,
   wherein the first space (S1) is disposed on one side of the magnet in the axial direction,
   wherein the second space (S2) is disposed on another side of the magnet in the axial direction,
   wherein the cover includes a first region having a different thickness in the radial direction from a center of the shaft,
   wherein the shaft includes a plurality of protrusions in contact with the magnet, wherein each of the plurality of protrusions includes a first face protruding from the outer surface of the shaft and a second face concavely disposed in an inner circumferential surface of the shaft, wherein each first face includes a first-first face and a first-second face, the first-second face including a curved surface in line contact with a side surface of the magnet to guide the magnet to be inserted between the protrusions, and wherein the first space (S1) and the second space (S2) are connected to the first region.

2. The motor of claim 1, wherein:

the cover includes a plurality of second regions disposed to be spaced apart from each other in a circumferential direction around a center of the shaft; and a distance from the outer surface of the shaft to the second region in a radial direction is smaller than a shortest distance from the outer surface of the shaft to the outer surface of the magnet in the radial direction.

3. The motor of claim 1, wherein:

the magnet includes a first unit magnet and a second unit magnet;

the second region is disposed between the first unit magnet and the second unit magnet; and the second region is disposed in an axial direction.

4. The motor of claim 1, wherein the cover includes a third region constituting a multilayer in a radial direction from a center of the shaft.

5. The motor of claim 4, wherein the cover includes a first layer and a second layer stacked on the first layer in the third region, and one side edge of the second layer is disposed to be inclined with respect to one side edge of the first layer.

6. The motor of claim 1, wherein the shaft includes a plurality of holes passing through an inner side to an outer side of the shaft and a plurality of protrusions that are disposed in the plurality of holes, respectively, and of which at least parts protrude from the outer surface of the shaft and are in contact with the magnet.

7. The motor of claim 1, wherein the plurality of protrusions are disposed to be spaced apart from each other in a circumferential direction of the shaft; and a separation distance between the plurality of protrusions in the circumferential direction is greater than or equal to a width of the magnet.

8. The motor of claim 7, wherein the plurality of protrusions are disposed to be spaced apart from each other in an axial direction of the shaft, and wherein a separation distance between the protrusions in the axial direction is smaller than or equal to a length of the magnet.

9. The motor of claim 1, wherein each of the first faces and the second faces includes at least one flat surface.

* * * * *